(12) United States Patent
Fulop et al.

(10) Patent No.: US 8,072,131 B2
(45) Date of Patent: Dec. 6, 2011

(54) HOLDER FOR INTEGRAL COMPACT FLUORESCENT LAMP WITH OUTER BULB

(75) Inventors: Jozsef Fulop, Budapest (HU); Karoly Talosi, Nagykanizsa (HU); Gabor Schmidt, Kecsked (HU); Janos Orban, Veresegyhaz (HU); Timea Sesztak, Budapest (HU)

(73) Assignee: General Electric Company, Schenectady, NY (US)

( * ) Notice: Subject to any disclaimer, the term of this patent is extended or adjusted under 35 U.S.C. 154(b) by 187 days.

(21) Appl. No.: 12/181,414

(22) Filed: Jul. 29, 2008

(65) Prior Publication Data
US 2010/0181911 A1    Jul. 22, 2010

(51) Int. Cl.
*H01J 61/30* (2006.01)
*H01J 17/16* (2006.01)

(52) U.S. Cl. .................. 313/318.12; 313/627; 313/634; 313/629; 313/630

(58) Field of Classification Search ........... 313/627–643
See application file for complete search history.

(56) References Cited

U.S. PATENT DOCUMENTS

| 5,629,586 | A | 5/1997 | Yasuda et al. |
| 2002/0000770 | A1 | 1/2002 | Shibata et al. |
| 2002/0153838 | A1* | 10/2002 | Johnston et al. ............. 313/570 |
| 2003/0011327 | A1* | 1/2003 | Moon .......................... 315/291 |
| 2004/0121698 | A1 | 6/2004 | Itaya et al. |
| 2004/0232815 | A1 | 11/2004 | Tomiyoshi et al. |
| 2005/0116604 | A1 | 6/2005 | Bobel |
| 2008/0164803 | A1 | 7/2008 | Arndt et al. |

OTHER PUBLICATIONS

PCT/US2009/049779 International Search Report.

* cited by examiner

*Primary Examiner* — Anne Hines
*Assistant Examiner* — Tracie Green
(74) *Attorney, Agent, or Firm* — Fay Sharpe LLP

(57) ABSTRACT

A lamp assembly having a CFL light source includes an outer envelope received around the light source. The outer envelope includes a first enlarged portion dimensioned for receipt about the light source and a second narrowed portion adapted for connection with a lamp base. A platform receives a first end of the CFL light source and supports the CFL within the envelope, the platform including a tapered perimeter portion dimensioned for abutting engagement with an interior surface of the envelope.

18 Claims, 5 Drawing Sheets

HOLDER FOR INTEGRAL COMPACT FLUORESCENT LAMP WITH OUTER BULB

BACKGROUND OF THE DISCLOSURE

Cross-reference is made to commonly-owned, co-pending applications Ser. No. 12/181,406, filed simultaneously herewith, entitled "FIXING MECHANISM FOR AN INNER ASSEMBLY TO OUTER BULB" and Ser. No. 12/181,419, filed simultaneously herewith, entitled "ELECTRIC LAMP WITH INNER ASSEMBLY AND OUTER BULB AND METHOD FOR MANUFACTURING".

This disclosure relates to a lamp assembly, and more particularly to a compact fluorescent lamp (CFL) assembly of the type having an outer envelope or bulb that encloses the lamp and the associated electronics therein. The disclosure may find use in related environments so that particular aspects may have application, for example, as alternative ways to generally secure a CFL and associated electronics to a lamp base.

More recent developments in CFL assemblies include incorporation of an outer bulb or envelope about the CFL source. It is desired that the associated electronics board or printed circuit board (PCB) that drives the CFL be incorporated into an integrated unit. That is, the electronics board is typically enclosed within a housing or shell that is axially positioned between the CFL source and a threaded base. In those designs where the CFL includes a series of interconnected, inverted U-shaped tubes, the overall diameter of the CFL source is generally narrow and thus the upper end of the shell that interconnects with a surrounding light transmissive envelope allows the CFL to be inserted through the open end of the outer envelope. Even then, the shell typically tapers or reduces to a neck or flare of a narrower dimension at an opposite end for mechanical and electrical connection with an associated socket that receives same. For example, it is common to have a threaded base, sometimes referred to as an Edison-style base, although pin type or plug-in type connections are also alternatively used.

In many instances, it is desired that a narrow end of an A-line-shaped outer envelope, i.e., the necked-down, smaller diameter portion adjacent the base of the lamp, be sized smaller than the minimum lateral dimension of the CFL. By way of example, a helical CFL has first and second ends that extend generally longitudinally or parallel to a lamp axis, while an intermediate portion forms one or more helical turns in an effort to maximize a length of a discharge path between the first and second ends of the CFL. It often becomes necessary to cut the outer envelope generally along the maximum diameter portion and insert the CFL source into the cut envelope. Thereafter, the outer envelope is re-sealed along the cut line of the envelope to enclose the CFL.

It will be appreciated that minimizing the number of components and labor intensive handling of components inserted into the outer envelope is desirable for ease of manufacture. That is, once the outer envelope is cut in two pieces, it is desirable that the inner components be inserted and fixed in position in an inexpensive, repeatable, reliable manner.

Moreover, as noted above, where the CFL and other components cannot be inserted through the narrow end of the outer envelope, the separated portions of the outer envelope must be cut and re-sealed. The re-sealing process exposes the installed components to elevated temperatures. Accordingly, there is a need not only for locating the inner lamp components in the outer envelope and fixedly securing them within the envelope, but there is also a need to thermally protect the sensitive electronic components on the electronics board during the re-sealing process.

It will be further appreciated that the neck or flare portion of the outer envelope has surface irregularities. Thus, attempts to secure inner components to the remainder of the lamp assembly have focused on alternative structures and manners of attachment.

Accordingly, a need exists for fixing or securing an inner assembly that includes a CFL source to an outer envelope in an effective, repeatable, and inexpensive manner.

SUMMARY OF THE DISCLOSURE

A holder is provided for securing a compact fluorescent lamp (CFL) assembly within an outer envelope.

The assembly includes a CFL light source, an outer envelope received around the light source and also receiving a platform receiving at least a first end of the CFL light source and supporting the CFL within the envelope. The platform includes a tapered perimeter portion for engagement with an interior surface of the envelope.

A compressible member is preferably disposed along the perimeter portion for conforming to the interior surface of the envelope.

A passage is preferably provided through the platform from a light source side to a ballast assembly side for communicating air into the envelope during assembly.

The platform preferably includes at least one leg extending outwardly from the ballast assembly side of the platform for positioning the CFL light source in the envelope. The platform further includes channel means for securing a perimeter edge of the printed circuit board.

The platform is preferably formed of a thermally insulating material to limit heat transfer therethrough.

Stop members are preferably provided on the platform to locate an insert position for the CFL light source.

A method of assembling a CFL with an outer envelope includes providing a platform, inserting the platform into a first portion of the envelope, positioning the platform relative to the envelope by abutting a peripheral portion of the platform against an inner surface of the envelope, and joining a second portion of the envelope to the envelope first portion to enclose the platform with the CFL light source.

The method may further include pressurizing an interior of the envelope during sealing of the first and second portions of the envelope.

Primary benefits relate to the fixing of the lamp without a separate intermediate collar axially located between the outer envelope and the lamp base, positioning the wire lamp, fixing the PCB, and providing thermal insulation.

Another benefit relates to insuring the ability of providing an over-pressure during the sealing process for better sealing quality.

The thermal insulation provided by the platform also improves the mercury vapor pressure of the CFL.

Still other benefits and advantages of the disclosure will become apparent from reading and understanding the following detailed description.

DETAILED DESCRIPTION OF THE PREFERRED EMBODIMENTS

Figure 1:
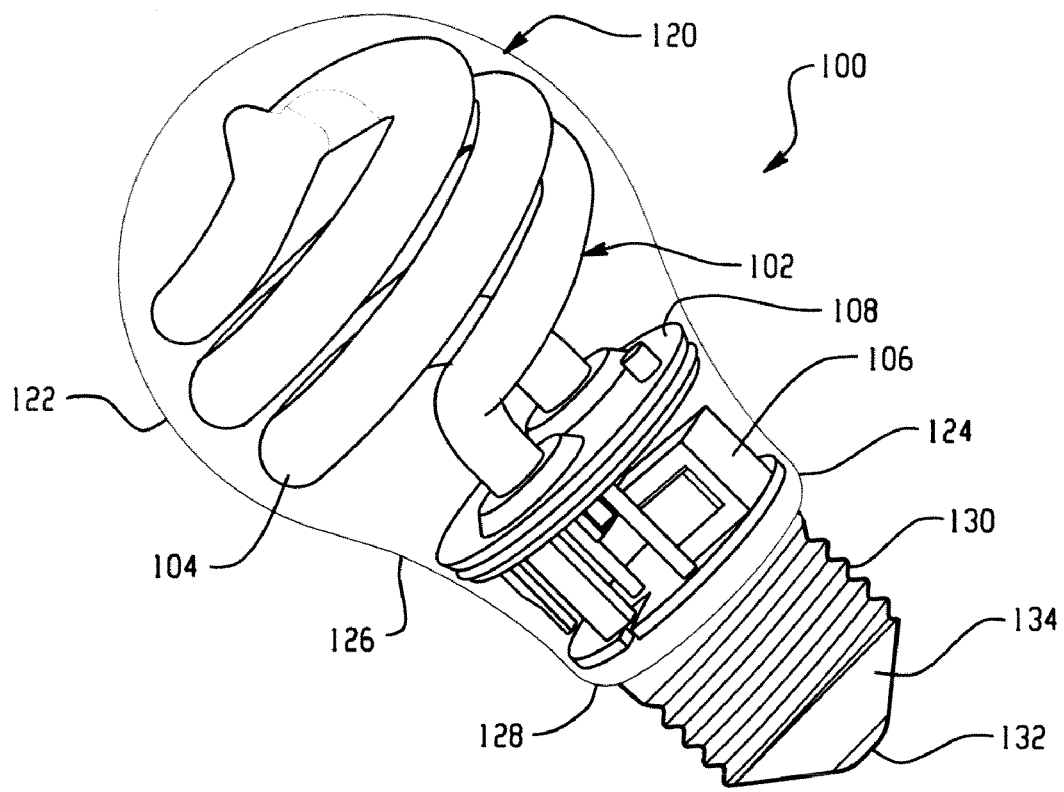
FIG. 1 is a perspective view of a lamp assembly that includes an inner assembly housed within an outer envelope.

Shown in FIG. 1 is a lamp assembly 100 that includes an inner assembly 102 having a light source 104 and electronics member or board, often referred to as a printed circuit board (PCB) 106, and a holder 108 that interconnects the light source and the electronics board so that the inner assembly can be handled as a sub-assembly (although it will be appreciated that the inner assembly can also refer to the holder combined with the CFL light source without the electronics board). Enclosing the inner assembly is an outer envelope or bulb 120 which is preferably a light transmissive material such as glass. The outer envelope encloses an inner cavity dimensioned to receive the inner assembly therein. More particularly, the outer envelope adopts the general conformation of an A-line lamp that has an enlarged generally spherical portion 122 at one end and a flare or neck portion 124 at the other end interconnected with the spherical portion by tapering region 126. The outer envelope has a generally constant wall thickness that terminates in an opening at a first end 128 disposed adjacent a conventional electrically conductive base 130, shown here as an externally threaded, Edison style base 130. The threaded base is separated from an end contact 132 by an insulating material 134. The base, and particularly the contact 132 and threaded region 130 thereof, are received in an associated lamp socket (not shown) to establish electrical and mechanical connection of the lamp assembly. Of course, other lamp bases such as conventional plug-in type connections that establish mechanical and electrical connection between the lamp assembly and an associated electrical socket can be used without departing from the scope and intent of the present disclosure.

Figure 2:
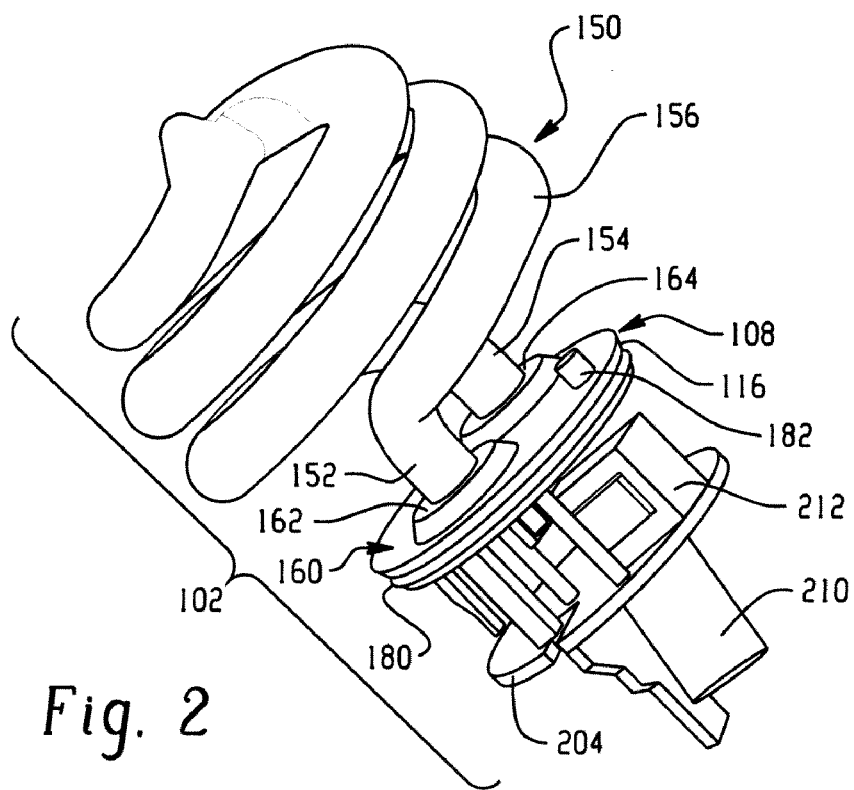
FIG. 2 is a perspective view of the inner assembly with the outer envelope and base removed.

FIG. 2 more particularly illustrates the inner assembly 102. The light source as illustrated here is a compact fluorescent lamp (CFL) 150 that includes first and second ends or legs 152, 154 that extend generally parallel to one another and in a longitudinal direction that is generally parallel to a central lamp axis of the lamp assembly 100. These legs 152, 154 house electrodes at opposite ends of an elongated discharge path that includes each leg and an intermediate discharge path formed in an elongated tube formed here into a helical or spiral lamp arrangement 156.

The CFL legs are received in the holder 108. Moreover, the holder includes a platform 160 that has first and second openings 162, 164 that closely receive the legs 152, 154 of the CFL, respectively. Insertion of the legs into the platform openings is limited by L-shaped stop members 170, 172. In this manner, the legs of the CFL light source are located at a desired position or location relative to the remainder of the light assembly, particularly locating the legs adjacent the electronics board.

The platform further includes an outer tapered perimeter 176 that substantially conforms to the tapered region 126 of the outer envelope. Disposed adjacent the tapered perimeter 176 is a shoulder 178 that receives a compressible or resilient ring, also referred to as a sealing O-ring 180, that slidably and sealingly engages with the inner surface of the tapering region 126 of the outer envelope. The tapered perimeter and compressible O-ring provides for desired positioning and location of the inner assembly 102 within the outer envelope. Preferably, the holder is formed of a heat-resistant material such as plastic and has sufficient rigidity and strength to provide a stable mounting of the CFL within the outer envelope. Further, the holder includes a passage 182 (FIG. 4) that communicates between a first or upper side 184 and a second or lower side 186. The passage 182 is provided to supply pressurized fluid, such as air, during a re-sealing process of the outer envelope which will be more particularly described below.

Figure 3:
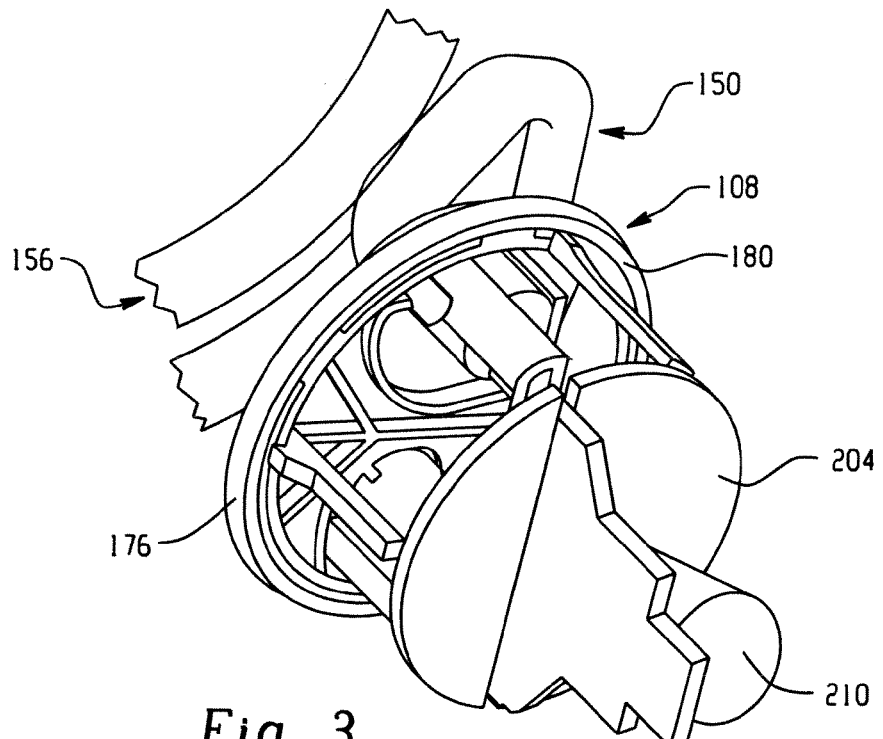
FIG. 3 is an enlarged perspective view of the inner assembly illustrating a lower portion of a CFL light source received in a holder that is secured to an electronics board.

Extending from the second side 186 of the holder are circumferentially spaced guide legs 188 (FIG. 3). The legs preferably have retaining shoulders 190 (FIG. 4) dimensioned for snap-fit engagement with the electronics board 106 via legs 200 having similar retaining shoulders 202 on the electronics board that cooperate with the retaining shoulders 190. Additionally, the guide legs 188 aid in directing and aligning the inner assembly as the inner assembly is directed toward the neck portion of the outer envelope. Moreover, extensions or support members 192 each have a channel 194 that engages a peripheral edge of the vertical PCB portion.

The electronics board also includes a disk or platform 204 that includes a slot 206 to receive a vertically extending portion of the PCB which carries various electrical components 210. It will be appreciated that the component is merely illustrative of one electrical component that may be disposed on the electronics board, and should not be intended to limit the construction. For example, other electrical components 212 may be disposed on an upper surface of the platform 204 to allow ease of connection with the legs 152, 154 of the CFL source.

Figure 4:
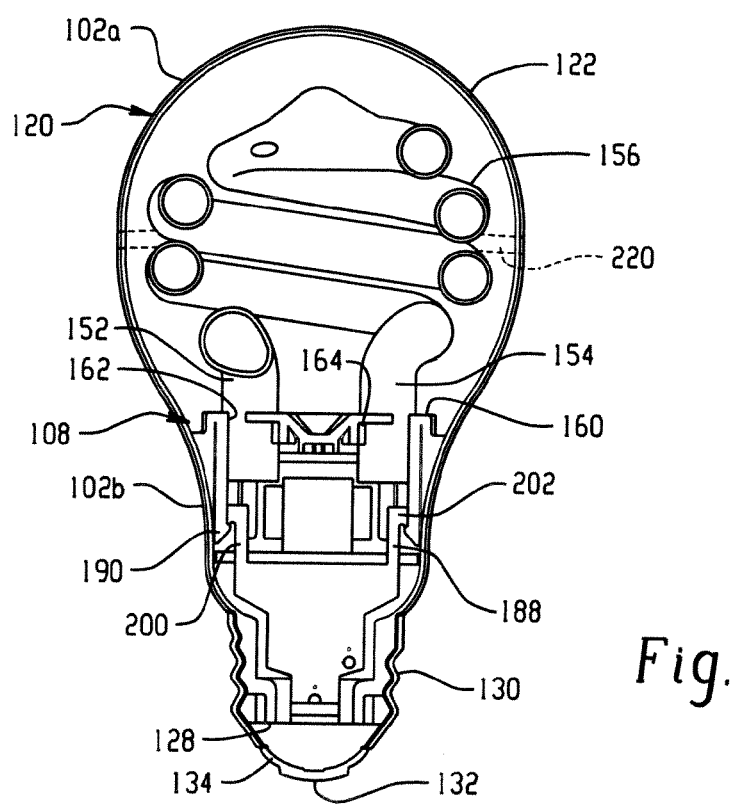
FIG. 4 longitudinal cross-section of FIG. 1.
Figure 5:
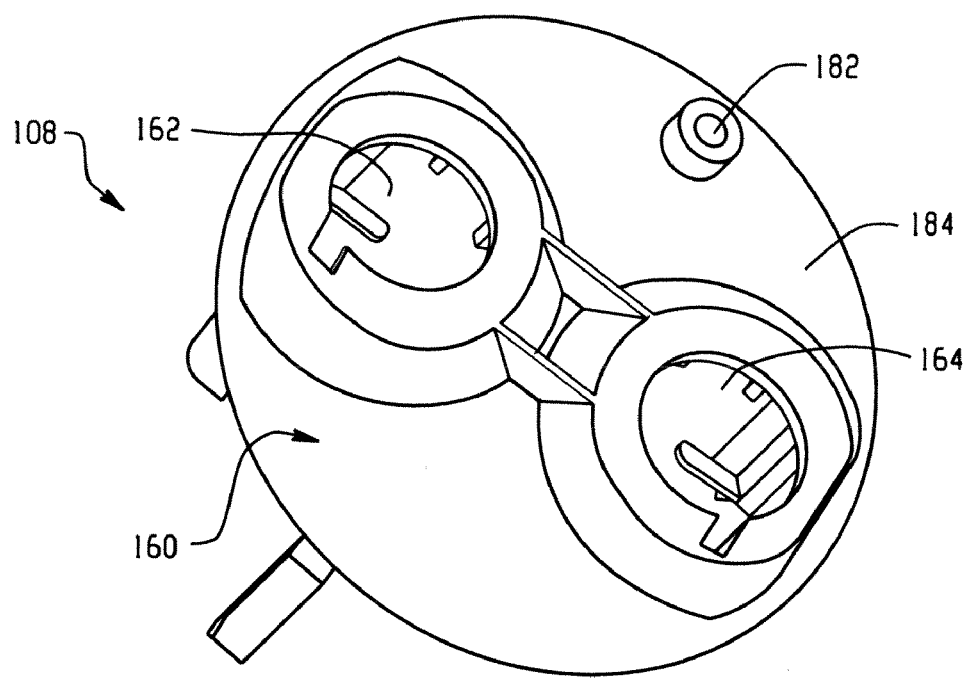
FIGS. 5-7 are top, bottom, and front perspective views of the holder.
Figure 6:
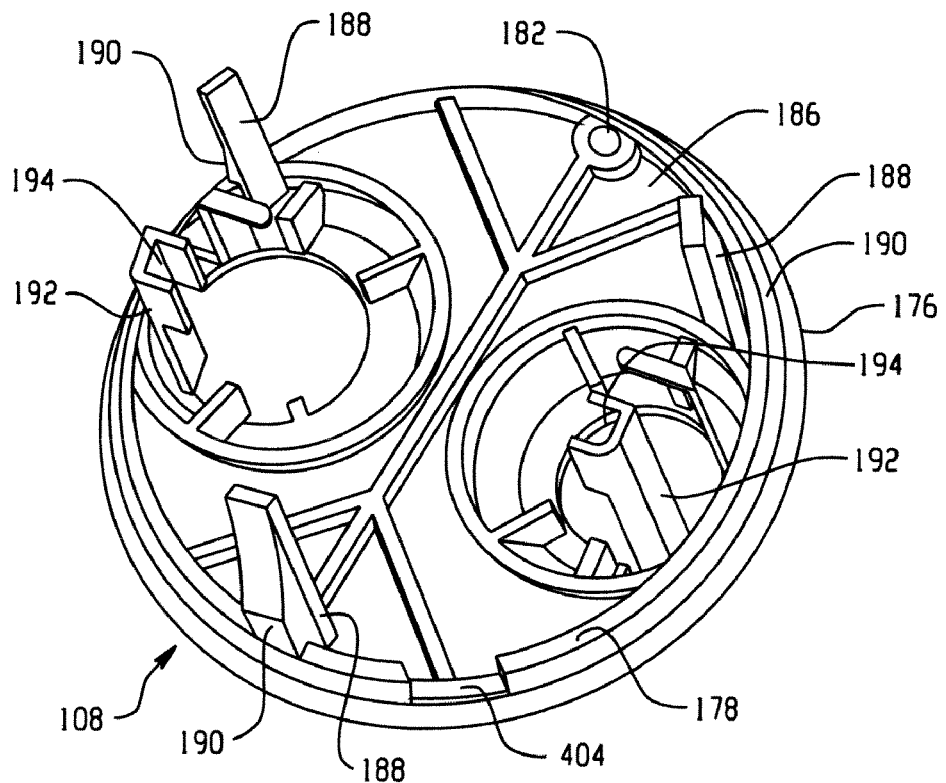
Figure 7:
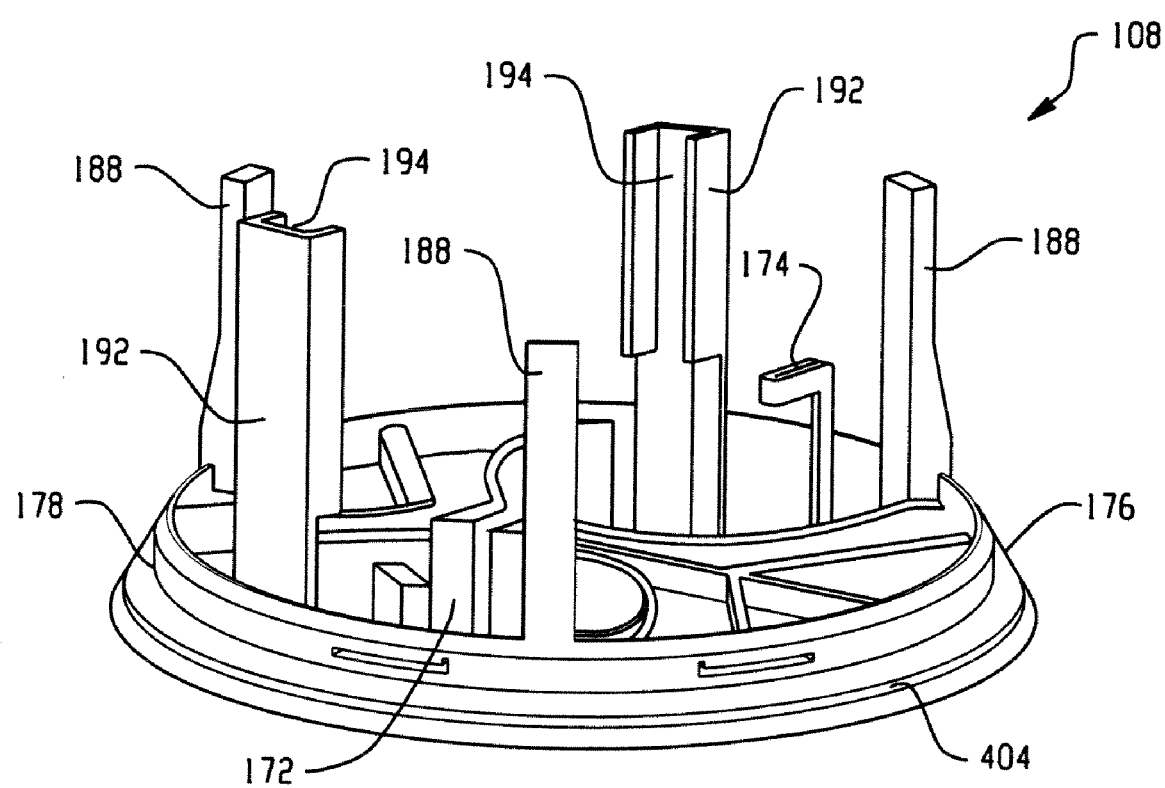

The inner assembly 102, as generally illustrated in FIG. 2, and as embodied into the lamp assembly as shown in FIGS. 3 and 4, may be pre-assembled as a sub-assembly. As is apparent from FIGS. 3 and 4, the diameter of the CFL source 150 is larger than the diameter or transverse dimension of the neck portion 124 of the outer envelope. In order to assemble the lamp, it becomes necessary to cut the outer envelope 120 along separation or parting plane 220 into first and second portions 120a, 120b. Once separated, the inner assembly 102 is inserted by directing the electronics board end initially inward into the lower portion 120b of the outer envelope. Once the inner assembly is fixed or retained in secured relation in a manner to be described below, the outer envelope is re-sealed along the plane 220 to define a one-piece outer envelope again.

Figure 8:
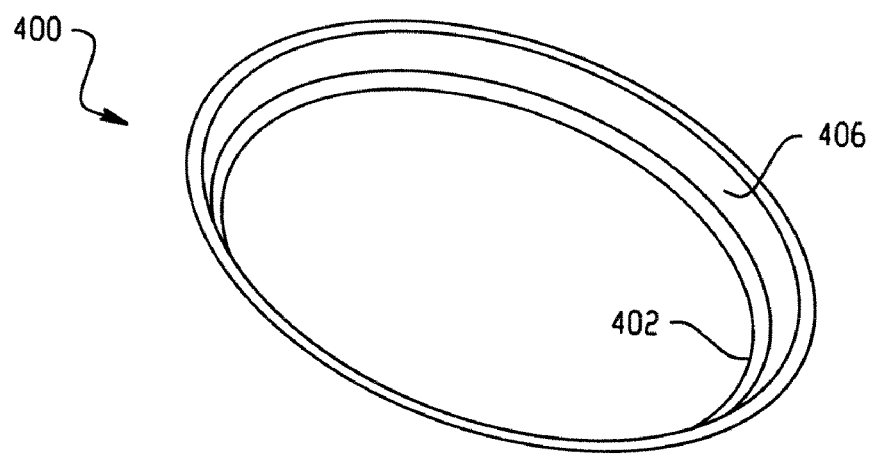
FIGS. 8-10 are perspective, plan and cross-sectional views, respectively of an alternative compressible member.
Figure 9:
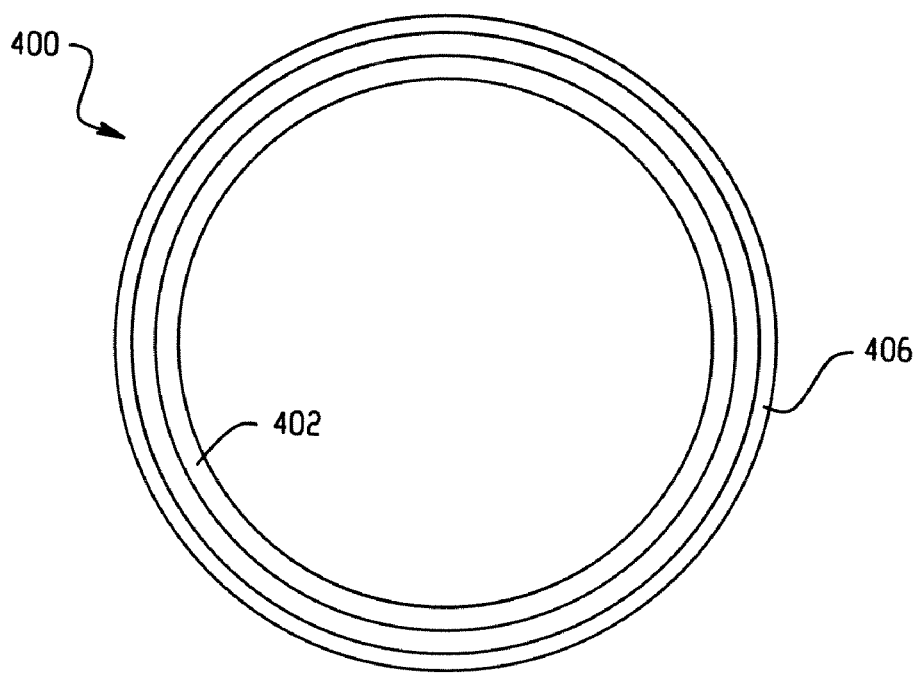
Figure 10:
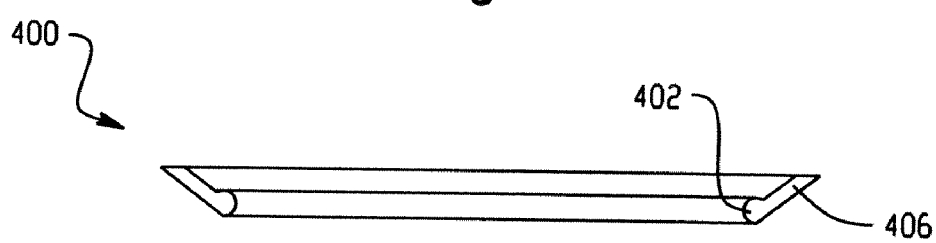

FIGS. 8-10 show an alternative compressible member 400 that has a tapered conformation that generally conforms to a portion of the tapered surface of the holder. The compressible member 400 includes an enlarged ring portion 402 received in an associated groove 404 in the perimeter of the holder, as well as a larger diameter, taper portion 406 that conforms and overlies the tapered surface of the holder. In this manner, enlarged portion 402 serves as the equivalent of a compressible O-ring and assures sufficient material to effect a seal between the upper and lower surfaces of the holder. The tapered portion 406 overlies the tapered perimeter of the holder and is thus situated between the holder and the inner surface of the outer envelope. Again, this conforms the inner assembly to potential irregularities in the manufacture of the outer envelope and further enhances the prospects of a seal between the holder and the inner surface of the envelope.

In summary, this disclosure provides a specially formed component, i.e., the holder, for self-ballasted CFLs having an outer envelope or bulb that holds fluorescent tubes (CFL) and a printed circuit board or ballast circuitry and fixes the CFL to an elongated part of the outer envelope. The holder serves a shielding function as well. The holder shields or helps to prevent the PCB and the ballast components from overheating during the cutting and sealing process of the outer bulb, as well as during normal operation of the lamp. The holder includes a rubber or silicon O-ring, or alternatively an adhesive material, for improving insulation and providing greater flexibility during fixing of the inner assembly to the outer envelope. The holder preferably has a specially formed rail part that holds and fixes the vertically oriented PCB. The rail preferably includes at least three (3) legs that are circumferentially spaced and help position the entire inner assembly into the outer envelope. The holder includes a special cylindrical portion having a passage through which air can be blown during the sealing process. The material of the holder can be varied, such as a plastic, silicone, or other materials that do not conduct heat and are able to withstand temperatures that occur during processing or assembly, as well as lamp operation.

The holder advantageously provides or serves three different functions, namely, wire lamp or CFL positioning, fixing or location of the PCB, and thermal insulation. The exhaust tube is placed in a location where the temperature is lower than the temperature at the lamp. This results in an improved mercury vapor pressure. The passage provided through the holder insures the ability to provide an over-pressure during the sealing process of the outer envelope and for a better sealing quality. The passage aids in balancing the pressure between the spaces located above and below the holder. This disclosure removes the need for an intermediate collar between the outer envelope and the base, fixes the ballast, and simplifies assembly and cost.

The disclosure has been described with reference to the preferred embodiments. Obviously, modifications and alterations will occur to others upon reading and understanding the preceding detailed description. It is intended that the invention be construed as including all such modifications and alterations.

What is claimed is:

1. A compact fluorescent lamp (CFL) assembly comprising:
    a CFL light source;
    an outer envelope received around the light source and including a first enlarged portion dimensioned for receipt about the light source and a second narrowed portion adapted for connection with a lamp base;
    a platform receiving a first end of the CFL light source and supporting the CFL within the envelope, the platform including a tapered perimeter portion dimensioned for abutting engagement with an interior surface of the envelope.

2. The CFL assembly of claim 1 further comprising a ballast assembly secured to the platform and electrically connected to the CFL light source.

3. The CFL assembly of claim 1 further comprising a compressible member along the perimeter portion for conforming to the interior surface of the envelope.

4. The CFL assembly of claim 1 wherein the platform includes an passage that extends therethrough from a light source side to a ballast assembly side for communicating air into the envelope.

5. The CFL assembly of claim 4 further comprising at least one leg extending outwardly from the ballast assembly side of the platform for positioning the CFL light source in the envelope.

6. The CFL assembly of claim 1 further comprising at least one leg extending outwardly from the platform for positioning the CFL light source in the envelope.

7. The CFL assembly of claim 1 further comprising a ballast assembly secured to the platform and electrically connected to the CFL light source, and means for interconnecting the ballast assembly in spaced relation to the platform.

8. The CFL assembly of claim 2 wherein the platform includes channel means for securing a perimeter edge portion of a printed circuit board of the ballast assembly.

9. The CFL assembly of claim 1 wherein the platform is formed of a thermally insulating material for limiting heat transfer from a first side to a second side of the platform.

10. The CFL assembly of claim 1 wherein the platform includes stop members for locating an insert position of the CFL light source relative to the platform.

11. The CFL assembly of claim 10 wherein the platform includes an opening dimensioned to receive a peripheral portion of the CFL light source therein and the stop members are spaced from the opening to limit an extent of insertion of the CFL light source through the opening.

12. A self ballasted compact fluorescent lamp (CFL) assembly comprising:
    a CFL light source;
    an outer envelope received around the light source and including a first enlarged portion dimensioned for receipt about the light source and a second narrowed portion adapted for connection with a lamp base;
    a platform receiving a first end of the CFL light source and supporting the CFL within the envelope, the platform including a tapered perimeter portion dimensioned for abutting engagement with an interior surface of the envelope, and a passage that extends therethrough for communicating air into the envelope from a light source side to a ballast assembly side of the platform; and
    a ballast spaced from the platform and electrically connected to the CFL light source.

13. The assembly of claim 12 further comprising a resilient seal member interposed between the platform perimeter portion and the interior surface of the envelope.

14. The assembly of claim 12 wherein the platform is formed of a thermally insulating material to protect the ballast during assembly.

15. The assembly of claim 12 further comprising plural circumferentially spaced legs extending outwardly from the platform for positioning the light source in the envelope.

16. The assembly of claim 12 further comprising first and second openings in the platform dimensioned to receive first and second ends of the light source, and first and second stop members associated with the first and second openings, respectively, for locating the light source relative to the platform.

17. The assembly of claim 12 further comprising first and second members extending from the platform that include channels therein for engaging peripheral edge portions of a printed circuit board associated with the ballast.

18. The assembly of claim 13 wherein the resilient seal member is an o-ring made of at least one of silicone material, elastomeric material and rubber material.

* * * * *